United States Patent [19]
Robbins

[11] Patent Number: 6,104,784
[45] Date of Patent: Aug. 15, 2000

[54] ARRANGEMENT FOR COMMUNICATING BETWEEN PUBLIC SAFETY ANSWERING POINTS AND AN AUTOMATIC LOCATION IDENTIFIER DATABASE

[75] Inventor: Christopher F. Robbins, Glen Ellyn, Ill.

[73] Assignee: Lucent Technologies Inc., Murray Hill, N.J.

[21] Appl. No.: 09/174,365

[22] Filed: Oct. 15, 1998

Related U.S. Application Data

[60] Provisional application No. 60/073,150, Jan. 30, 1998.

[51] Int. Cl.[7] .................................................. H04M 11/04
[52] U.S. Cl. ................................. 379/45; 379/37; 379/49; 379/94; 379/201
[58] Field of Search .................................. 379/45, 49, 96, 379/142, 201, 207, 265, 266, 211, 127, 37, 94

[56] References Cited

U.S. PATENT DOCUMENTS

| | | |
|---|---|---|
| 5,311,569 | 5/1994 | Brozovich et al. ........................ 379/48 |
| 5,444,476 | 8/1995 | Russ . |
| 5,661,779 | 8/1997 | Lee . |

Primary Examiner—Creighton Smith
Attorney, Agent, or Firm—Werner Ulrich

[57] ABSTRACT

Emergency service calls, such as 911 calls, are routed to specially trained operators at public service answering points (PSAPs). A PSAP switch, a special focus private branch exchange (PBX), is provided for interconnecting incoming PSAP calls to a PSAP position staffed by a PSAP operator. The PSAP position comprises a telephone facility for talking to the caller, and a PC for accessing and displaying data about the caller, i.e., the caller's address, and any special characteristics such as a caller's disability, etc. An ISDN, (Inte-grated Services Digital Network), line connects a tandem access switch used for routing PSAP calls with the PSAP switch. The ISDN facility is used for conveying information about the caller for display at the PC of the answering PSAP position. Advantageously, this arrangement provides an integrated system for communicating both the voice of the caller, and the data describing the caller to a PSAP operator. In order to use the ISDN facility for receiving the information about the caller, a multi-point capability of the ISDN facility is used to permit a PC to access the D-channel of the ISDN facility. Advantageously, no separate data facility is required for this purpose.

5 Claims, 2 Drawing Sheets

ARRANGEMENT FOR COMMUNICATING BETWEEN PUBLIC SAFETY ANSWERING POINTS AND AN AUTOMATIC LOCATION IDENTIFIER DATABASE

CROSS-REFERENCE TO RELATED APPLICATION

This Application claims priority of Provisional Application, Ser. No. 60/073,150 entitled, "Multiple Switch Termination For Public Safety Answering Points", filed by the Applicant of this Application, plus five other Applicants, on Jan. 30, 1998. It is related to an Application with the title "Improved Arrangement for Public Saftey Answering Points", being filed concurrently with this Application, and assigned to the Assignee of this Application by the same six Applicants who filed the Provisional Application.

TECHNICAL FIELD

This invention relates to arrangements for more efficient facilities for public safety answering points (PSAPs).

PROBLEM

Emergency service calls such as 911 calls are routed to specially trained operators at public service answering points (PSAPs). It is important that calls to these agents be handled expeditiously and that the location of the caller be provided to the PSAP operator as quickly as possible. It has also been found desirable that PSAP operators be familiar with the territory from which the calls they serve originate. Consequently, 911 calls are normally routed to small groups of PSAP operators, typically, two to four, although 911 calls in large cities may be routed to much larger groups.

In the most common PSAP arrangements, 911 calls are routed from end offices to a tandem office for collecting the traffic from many such end offices, and thence, routed from the tandem office to a PSAP position. The caller is identified using automatic number identification to pass the caller's telephone number to the PSAP positiuc. computer (PC) is then used by the PSAP operator to access an automatic location identifier (ALI) database to provide the PSAP operator with location information for the caller.

In addition, some people choose to call Police or Ambulance service using a conventional telephone number instead of 911. Calls to these telephone numbers are also routed to a PSAP operator over usually "administrative lines", to a different telephone. The present prior art PSAP arrangements are inefficient and costly.

SOLUTION

Applicant has recognized that a problem in the arrangements of the prior art is that the arrangement for accessing ALI data for a PSAP system is inefficient. In accordance with Applicant's invention, a PC that wishes to query an ALI database is connected by a connection that bypasses a PSAP switch, using the well known multi-point capability of an ISDN (Integrated Services Digital Network), BRI (Basic Rate Interface), or PRI (Primary Rate Interface), that connects the 911 tandem access switch to the PSAP switch. The D-channel of the ISDN connection is used for accessing the ALI database. This arrangement is used for accessing the ALI database even when the call that comes in is a call over an administrative line which is typically an analog line. The multi-point arrangement allows the ALI query and ALI reply to be transmitted over the D-channel of the BRI or PRI on a time shared basis with the normal control signals for controlling the voice connection between the caller and the PSAP operator. Advantageously, this arrangement allows the ALI query and response to be transmitted and received, using only one ISDN station, (plus a second station if reliability is desired).

DETAILED DESCRIPTION

Figure 1:
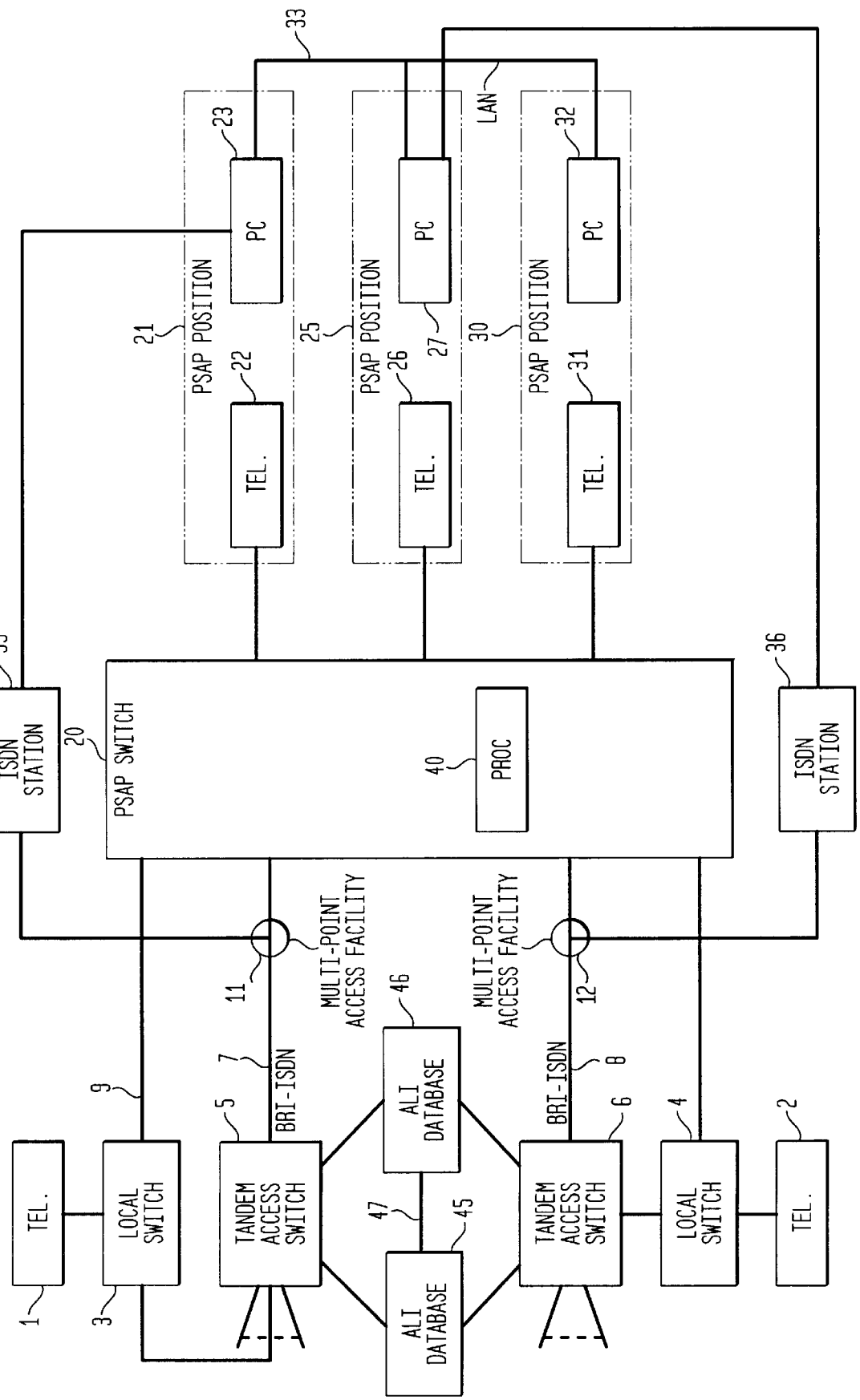
FIG. 1 is a block diagram illustrating the operation of Applicant's invention.

Telephones 1 and 2 are connected respectively to local switches 3 and 4. Local switch 3 accesses the PSAP 20 switch via a tandem access switch 5 whereas local switch 4 accesses PSAP switch 20 via a tandem access switch 6. The presence of two tandem access switches provide redundancy in case of failure; in many cases, local switches are connected via the public switched telephone network to two different tandem access switches. Tandem access switches 5 and 6 are connected to PSAP switch 20 by an ISDN connection 7 and 8 respectively, terminating in a Basic Rate Interface (BRI). This in general is likely to be several connections since a PSAP operator normally handles several calls simultaneously, and since there are typically at least two PSAP operator positions attached to a PSAP switch. For much larger PSAP switches, a primary rate interface (PRI) ISDN connection can be used.

The local switches 3 and 4 are also connected, possibly via other switches of the public switched telephone network, to PSAP switch 20 over administrative lines 9 and 10 respectively. These connections are for connecting PSAP operators to customers who have not dialed 911, but have directly dialed the telephone number of Police, Fire or Ambulance Service.

The PSAP switch is a special purpose private branch exchange (PBX) switch which interfaces with the public switched telephone network via ISDN lines (facilities) used as PBX trunks 7 and 8, and administrative lines 9 and 10. PSAP switch 20 is connected to PSAP operator positions 21, 25, and 30. Each operator position comprises a telephone station (22, 26, or 31) and a PC (23, 27 or 32). The PSAP operator stations can be analog or digital stations, and the PSAP switch can be an analog or digital switch. In Applicant's preferred embodiment, the telephone station and the PC are not directly connected, but are connected only by virtue of the fact that the same operator hears the caller on the telephone station and controls and reads outputs from the PC.

PSAP switch 20 is controlled by a processor 40. This processor 40 receives the ANI information transmitted with each call, and forwards this ANI information over CTI link 42 to a server PC, in this example, PC 27. While in this case, CTI link 42 is shown as being connected to PC 27, which thereby becomes the serving PC, the link could be connected to either of the other PCs. If desired, two CTI links might be provided, each connected to a different PC, in order to provide additional safety.

The PCs are interconnected by a local area network 33. PC 27 accesses the ALI database 45 via both of the ISDN stations 35 and 36, and via the PC 23 and 27 connected to those ISDN stations. The D-channel of the ISDN connection is used for accessing the ALI database. This arrangement is used for accessing the ALI database even when the call that comes in is a call over an administrative line which is typically an analog line. The ISDN station is connected to a BRI interface with ISDN facility 7 or 8 by a multi-point connection. This arrangement allows the ISDN station 35 and 36 to transmit request data to both of the tandem access switches 5 or 6; those tandem access switches can then forward the ALI request to ALI databases 45 and 46. ALI database 46 is provided to insure that service is not interrupted if ALI database 45 fails, and to increase the number of requests that can be processed when both the databases are operative. Only one of the ALI databases responds to the request. The ALI databases 45 and 46 are connected by a data link 47 which allows information to be exchanged for the purpose of selecting which ALI database is to respond. Only one of the ALI databases responds to the request, and sends that response to only one of the tandem access switches.

The ALI query and response is done by using the ISDN station as modems for data. The positions that perform the request, and the position that receives the ALI response communicate with the specific operator position handling the call via the LAN.

The multi-point facilities 11 and 12 allow the ISDN stations 35 and 36, respectively, to access the D-channel of the BRI interface terminating the ISDN lines 7 and 8 between the tandem access switches and the PSAP switch. This permits ISDN stations 7 and 8 to insert or extract D-channel signals from the D-channel of the BRI facility connected to the PSAP switch, and is used for carrying conversations to the PSAP positions; advantageously, no additional facility is required to transmit the ALI data to the PSAP.

Figure 2:
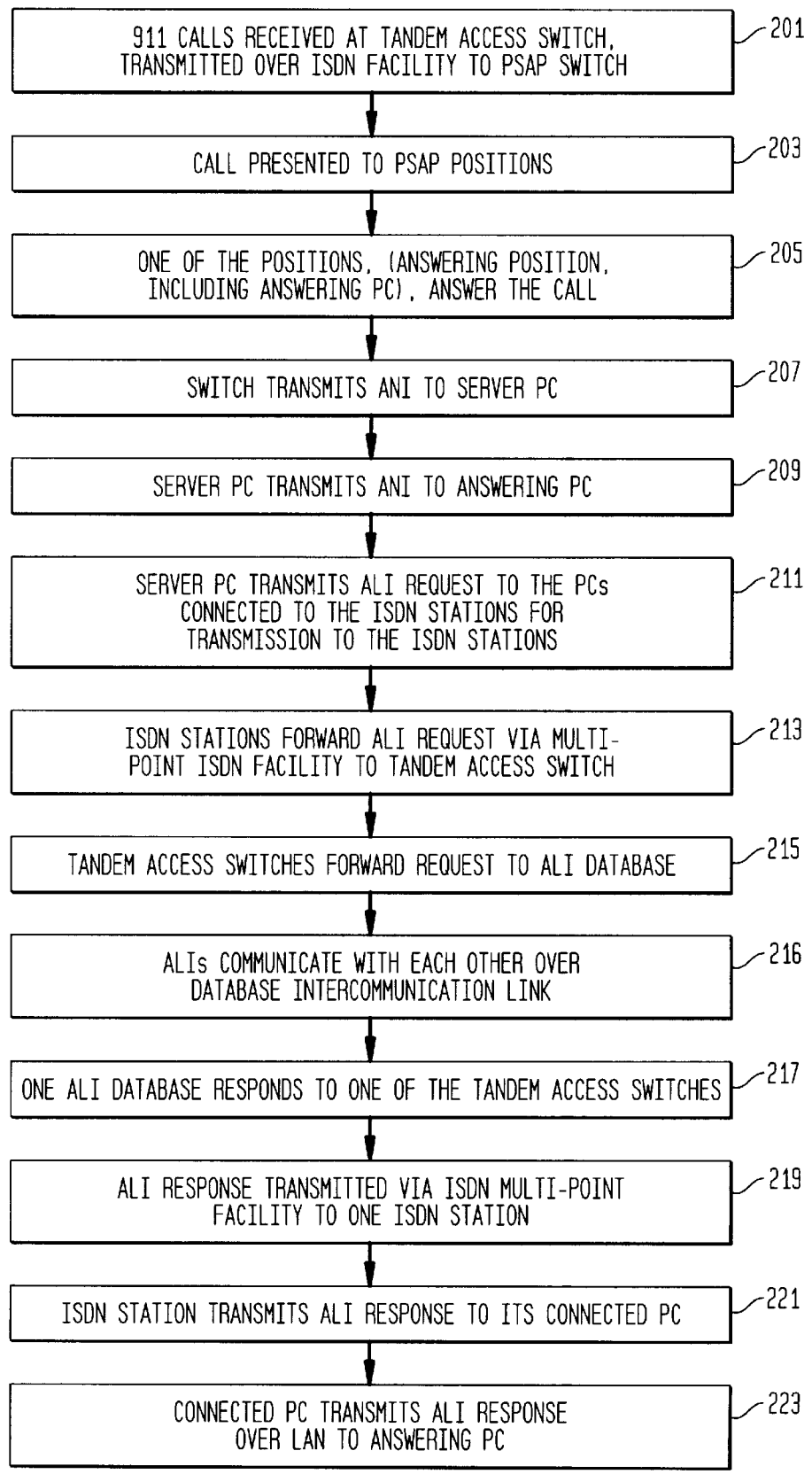
FIG. 2 is a flow diagram illustrating the steps for establishing a 911 call.

FIG. 2 illustrates the method of Applicants' invention. A customer dials a 911 call which is routed from the local switch via the tandem access switch over an ISDN facility to the PSAP switch (Action Block 201). Along with the call, the automatic number identification, (ANI), number of the calling station is transmitted to the PSAP switch. If the call goes from the local switch to the PSAP switch without going through one of the tandem access switches, i.e., via one of the administrative lines, 9 or 10, the PSAP switch may also receive the ANI number for that call. The PSAP switch then presents the call to some, or, in the preferred embodiment, to all PSAP positions, (Action Block 203) of which one of the positions answers the call (Action Block 205), sometime prior to the execution of Action Block 223. The switch transmits the ANI number to the server PC, i.e., the PC connected to the CTI link, (PC 27 in the example of FIG. 1), (Action Block 207). The server PC transmits ANI to the answering PC, (Action Block 209); this step is accomplished when one of the positions, the one connected to the answering PC, answers the call, which may be at any time prior to, or concurrent with, Action Block 223. The server PC transmits an ALI request to the PCs connected to the ISDN stations (Action Block 211). In the example of FIG. 1, these two PCs are PC 23 and 27. The ALI request is transmitted over the LAN interconnecting the PCs. The ISDN stations forward the ALI request via a multi-point ISDN facility to the tandem access switches connected to the two multi-point ISDN facilities (Action Block 213). The tandem access switches forward the request to the ALI databases (Action Block 215). The ALI databases communicate with each other to ascertain which database is to respond to the query (Action Block 216). One of the ALI databases responds with the ALI data to one of the tandem access switches (Action Block 217). The ALI response is transmitted from that tandem access switch via its connected ISDN facility, and the multi-point facility of the BRI of that ISDN to the connected one of the ISDN stations (Action Block 219). That ISDN station transmits the ALI response to its connected PC (Action Block 221). The connected PC then transmits the ALI response over the local area network (LAN) to the answering PC for display to the operator at the answering PSAP station, or, if no PSAP position has answered the call, as soon as a PSAP position does answer the call, thereby becoming the answering PSAP position and having the answering PC, (Action Block 223).

Because of the nature of the PSAP application, it is particularly important that the service be provided in a highly reliable manner. The particular duplication scheme described above is one way of achieving this high reliability. Other duplication arrangements will be apparent to those of ordinary skill in the art.

The above description is of one preferred embodiment of Applicant's invention. Many other arrangements will be apparent to those of ordinary skill in the art. The invention is thus limited only by the attached Claims.

I claim:

1. Apparatus for providing PSAP (Public Service Answering Point) service comprising:

a plurality of PSAP positions; and a PSAP switch for connecting incoming emergency calls to one of said PSAP positions;

each PSAP position comprising at least one telephone station, and at least one PC (personal computer);

said telephone station for receiving a voice call;

said PC for receiving and displaying ALI (Automatic Line Identification data for said voice call;

said PSAP switch for receiving an ANI (automatic number identification), number for each incoming voice call;

one of said PCs for requesting ALI information for a received ANI number;

wherein at least one of said PCs is connected via an ISDN (Integrated Services Digital Network) station to an ISDN facility, connecting said PSAP switch to an Access Tandem Switch for accessing an ALI database, by a multi-point capability for accessing a D-channel of said ISDN facility.

2. The apparatus of claim 1, further comprising:

a local area network for interconnecting PCs of said PSAP switch, and for transmitting ALI data, from said at least one PC for receiving said ALI data, to a PC of an answering PSAP position;

wherein a D-channel of an ISDN connection between said PSAP switch and said tandem access switch carries ALI data received by said tandem access switch from said ALI database to said PSAP switch.

3. The apparatus of claim 1, wherein said at least one PC is further for transmitting ALI data for incoming administrative calls to one of said PSAP positions.

4. A method of providing PSAP (Public Service Answering Point) service comprising the steps of:

receiving a PSAP call, including ANI (Automatic Number Identification) data, at an access tandem switch;

connecting said PSAP call to a PSAP switch comprising a plurality of PSAP positions, each PSAP position including a PC (Personal Computer) and a telephone station;

in said PSAP switch, offering said call to a plurality of PSAP positions;

transmitting said ANI data for said call to one of the PCs, the server CP, of said PSAP switch;

said server PC requesting ALI (Automatic Location Identifier) data corresponding to said ANI data;

an ALI database supplying said ALI data to said server PC;

responsive to receipt of an answer signal from one of said plurality of PSAP positions, connecting said PSAP call to the one PSAP position; and transmitting said ALI data from said server PC to a PC of the connected answering PSAP position for display at that PC;

wherein the step of requesting said ALI data comprises the steps of:

transmitting said request from said server PC to a PC connected to an ISDN (Integrated Services Digital Network) ISDN station; and transmitting said request from said ISDN station to a multi-point facility for transmission over an ISDN line to an access tandem switch for accessing said ALI data.

5. The method of claim 4, further comprising the steps of:

receiving another call from a switch other than an access tandem switch; and processing said other call in the same manner as said PSAP call, using said ANI data of said other call.

* * * * *